United States Patent

[11] 3,628,988

[72] Inventors Miroslav Stol;
  Vladimir Stoy; Karel Kliment, all of
  Prague; Milan Prokes, Olomouc; Jaromir
  Mares, Cernosice, all of Czechoslovakia
[21] Appl. No. 749,343
[22] Filed Aug. 1, 1968
[45] Patented Dec. 21, 1971
[73] Assignee Ceskoslovenska akademie ved
  Prague, Czechoslovakia
[32] Priority Aug. 16, 1967
[33] Czechoslovakia
[31] 5891/67

[54] METHOD FOR PROVIDING ARTIFICIAL
  DENTURES WITH A SOFT HYDROGEL LAYER
  6 Claims, No Drawings
[52] U.S. Cl. .................................................. 117/63,
  32/2, 117/72, 117/138.8, 117/161, 260/885,
  264/16, 264/17
[51] Int. Cl. .................................................... B32b 27/08,
  A61c 13/00
[50] Field of Search ............................................ 117/138.8
  U, 161 UC, 161 UH, 72, 63; 264/1, 16, 17; 32/2;
  260/885

[56] References Cited
UNITED STATES PATENTS

| | | | |
|---|---|---|---|
| 2,420,570 | 5/1947 | Shapiro ........................ | 117/72 |
| 2,874,467 | 2/1959 | Becker et al. ................. | 264/16 |
| 3,446,875 | 1/1969 | Bruckmann et al. .......... | 32/2 |
| 3,496,254 | 2/1970 | Wichterle ..................... | 264/1 |
| 3,499,862 | 3/1970 | Wichterle ..................... | 264/1 |

Primary Examiner—William D. Martin
Assistant Examiner—J. E. Miller, Jr.
Attorney—Richard Low ABSTRACT: Mixture for providing a hydrogel layer on a hard denture consisting of a soluble glycol methacrylate or glycol acrylate polymer, a glycol methacrylate or glycol acrylate monomer consisting of 98 to 99.95 percent of the monoester and 0.05 to 2 percent of the diester, a polymerization initiator and a water-soluble solvent capable of dissolving in anhydrous condition the soluble glycol methacrylate or glycol acrylate polymer as well as the polymer of the hard denture. The solvent is used in an amount which causes an approximately equal swelling as water in equilibrium with the resulting hydrogel, from which it is entirely removed by washing the denture in water. The method is also suitable for rebasing old dentures.

METHOD FOR PROVIDING ARTIFICIAL DENTURES WITH A SOFT HYDROGEL LAYER

GENERAL DISCLOSURE

It is known to provide artificial dentures made from polymethylmethacrylate with a soft base layer in order to avoid hurting the palate and other parts of the mouth by uneven pressure exerted thereon. For this purpose various soft and elastic materials have been proposed such as natural and silicone rubber, highly plastified polyvinylchloride, guttapercha, butyl methacrylate polymer and other polymers of esters of methacrylic and acrylic acid with higher aliphatic alcohols, and also soft elastic hydrogels such as polymers of glycol acrylates or glycol methacrylates cross-linked by 0.05–2.0 percent of the corresponding diester (e.g. ethylene glycol dimethacrylate).

The hydrogels were used for making soft base layers on artificial dentures in the form of highly viscous prepolymers of glycol monomethacrylate containing a small amount usually less than 1.0 percent of glycol dimethacrylate. The high viscosity was attained partly by suitable degree of conversion, and partly by admixture of active fillers such as finely divided silica. Active fillers enhance the physicomechanical properties of the hydrogel, particularly its tensile strength.

The prepolymers of this kind always contain a polymerization initiator and have to be kept cool in order to avoid premature polymerization leading to an insoluble, cross-linked hydrogel which cannot be bound thereafter with the hard polymer of the artificial denture. The prepolymer consists essentially of a solution of glycol methacrylate polymer in the corresponding monomer, of the polymerization initiator such as dibenzoyl peroxide and of an active filler. It is used in such a way that it is brought onto the hard polymer skeleton in a mold, and filling the space which was left between it and a distancing foil. The surplus of the prepolymer is removed by pressing the two parts of the mold together, whereafter the polymerization is finished by heating in a water bath. The glycol methacrylate monomer penetrates into the polymethylmethacrylate of the hard skeleton, securing thereby a fairly good binding. The bond is, however, weakened by subsequent swelling of the hydrogel layer in water. The tangential stress may sometimes reach such a high value that the hydrogel layer separates from the hard skeleton of the artificial denture. The undesired volume changes also undesired changes of the surface relief of the hydrogel layer.

It is an object of the invention to increase the strength of the bond between the hydrophobic skeleton and the hydrogel even when the latter is swollen with water. Another object of the invention is to extend the pot life of the mixture to be applied onto the hard skeleton of the denture. A further object of the invention is to prepare a two component preparation consisting of dry powdered polymer and liquid monomer-containing mixture, which components are stirred together before use.

The method according to the invention consists in preparing a mixture of noncross-linked, soluble glycol methacrylate or acrylate polymer, a glycol monomethacrylate or acrylate monomer containing 0.05 to 2.00 percent of the respective diester as cross-linking agent, a polymerization initiator and a water-soluble solvent capable of dissolving in anhydrous condition both the above soluble polymer as well as the hard polymer of the artificial denture. The solvent is used in an amount which causes an approximately equal swelling as water in the equilibrium condition with the resulting hydrogel. The mixture is applied onto the hard skeleton of the artificial denture and maintained at polymerization temperature either in a mold or in the mouth of the patient until an irreversible, cross-linked gel is formed. Afterward the finished polymerization the artificial denture is washed until the solvent is entirely removed and replaced by water. If desired, a washing with diluted alcohol may be interposed in order to remove also the remainders of the initiator and other soluble admixtures.

If the amount of the solvent is properly chosen, the resulting hydrogel is swollen thereby to approximately the same degree as it is swollen by water after having been thoroughly washed. Thus, the swelling in water causes no or nearly no tangential stress between the hard polymethylmethacrylate and soft hydrogel layer.

Among suitable common solvents for the hydrophilic, noncross-linked polymer and the hydrophobic hard polymer of the substrate, substantially anhydrous ethylene glycol monoacetate and glycerol diacetates proved best. It is, however, possible to use also to various other water-soluble but substantially anhydrous solvents such as lower alkyl monoethers of ethylene or polyethylene glycols, dimethyl formamide, monomethyl formamide, formamide, glacial acetic acid and the like. Most of them possess a higher swelling capacity for the resulting hydrogel than water and their amount is to be chosen accordingly, i.e. lower than the amount of water in the hydrogel swollen to equilibrium. Obviously, if a solvent dissolves a polymer, it is also well miscible with the respective monomer, so that the mixture is homogeneous.

The bond between the two materials can be further enhanced, if the hard substrate, usually polymethylmethacrylate, is first repeatedly wetted with a mixture of the used glycol methacrylate or glycol acrylate monomer with the monomer of the hard substrate, usually methyl methacrylate.

The polymerization of the mixture onto the hard polymer is carried out in usual way, by means of a suitable polymerization catalyst or initiator and by using a suitable temperature. Redox systems cause a rapid polymerization even at temperatures of about 40° C. or lower.

If the glycol methacrylate or acrylate monomer is to be mixed with a comonomer, the latter must be chosen carefully in order not to decrease the solubility of the noncross-linked glycol methacrylate or acrylate polymer. For instance methyl methacrylate precipitates said polymer if it is added in a substantial amount and cannot be freely used although its high affinity to the hard substrate polymer would be very desirable. If, however, the noncross-linked glycol methacrylate or acrylate polymer is replaced by the corresponding copolymer of methyl methacrylate, the admixture of methyl methacrylate to the glycol methacrylate or acrylate monomer can be varied within proper limits, e.g. from 1 to 5 percent without damage. Otherwise all hydrophobic lower aliphatic esters, both unsaturated and saturated such as ethyl acetate and butyl acetate are unsuitable since the chains of the glycol methacrylate or acrylate polymer remain folded in interaction with them and tend to aggregate. Thus, the noncross-linked glycol methacrylate or acrylate polymer acts, in presence of such undesirable solvents, rather as an inert filler, decreasing the physiomechanical properties of the hydrogel and its bond with the substrate. In presence of comonomers which are desirable solvents for the polymer, the chains of said polymer are unfolded and open to chain transfer reactions by which they are incorporated into the network of the hydrogel formed by polymerization as its integral part. Such suitable comonomer is e.g. diethylene glycol monomethacrylate. Since it yields, hydrogels which swell extremely in water, its admixture is limited to some 25 percent of the monomer component.

The monomer component forms together with the noncross-linked polymer the macromolecular network of the hydrogel. Moreover, it secures a strong bond between the hydrogel and the hard polymer into which it partly penetrates prior to the polymerization; the diffusion of the glycol methacrylate or acrylate monomer into the hard hydrophobic polymer is aided by the swelling activity of the solvent which makes the hard polymer more accessible for the monomer. The polymerization of the monomer within the hard polymer results in forming many covalent bonds caused partly by existing "frozen" macroradicals and remainders of the methyl methacrylate monomer in the hard polymer and partly by chain-transfer reactions. Thereby various grafted and block copolymers are formed within the boundary layer, enhancing the bond between the hydrophobic material and the swollen hydrogel. This bond is gradual and excludes high-tangential stresses when the artificial denture is dried and swelled again.

Although any suitable cross-linking agent can be used which is sufficiently soluble in the mixture, glycol dimethacrylates or diacrylates are preferred not only for their good properties, but also for the fact that they are usually present in the monoesters from which they can be removed but with considerable effort.

The polymeric component of the mixture, the noncross-linked glycol methacrylate or acrylate polymer, increases the viscosity and makes the handling easier. The addition of a separately prepared polymer to the monomer has, in comparison with the known prepolymers, the following advantages: First, a storable viscous solution can be prepared containing no polymerization catalyst which is added just before use. The danger of spontaneous irreversible gelation is thus substantially reduced even when the mixture is kept for some time at ambient temperature. Second, the use of a separately prepared noncross-linked polymer makes possible the two component process, in which the powdered, a peroxidic compound containing polymer is mixed just before use with the monomer, solvent mixture, which can, if desired, contain a reducing agent such as a tertiary amine or a sulfinic acid. Then, an effective redox system is formed and the mixture can be used for making "chair-side" hydrogel layers on old artificial dentures which are rebased directly in the patients mouth.

The ability of the noncross-linked polymers to be homogeneously incorporated into the network formed by the polymerizing glycol monomethacrylate or acrylate containing 0.05 to 2.0 percent of the cross-linking diester is particularly advantageous. Surprisingly, the copolymers thus formed do not differ markedly from the cross-linked hydrogels prepared by polymerizing the same monomer mixture in absence of the noncross-linked polymer.

The soluble, noncross-linked glycol methacrylate or acrylate polymers can be prepared by two different methods. The first one consists in polymerizing pure glycol monomethacrylate or acrylate, containing less than 0.05 percent of the diester. The polymerization can be carried out, in this case, in any solvent or without any solvent, the method has, however, the disadvantage that such very pure glycol monoesters are very difficult to prepare. The diester is formed easily not only during the preparing of the monoester, but also during the vacuum distillation of the monoester, the reesterification being a typical equilibrium reaction.

The other method is much more convenient since it starts from monoesters which can contain rather large amounts of the diester. The method, disclosed in the copending U.S. Pat. application Ser. No. 639,021 or in the French Pat. No. 1,523,779 consists in polymerizing glycol monomethacrylate or monoacrylate containing up to about 40 percent of glycol dimethacrylate or diacrylate in presence of such desirable solvents having the interaction parameter $\chi$ with respect to the polymer lower than 0.5. Solvents of this kind prevent cross-linking and the resulting monoester diester copolymer remains soluble. The method allows also copolymerization with various comonomers such as methyl methacrylate.

The use of a common anhydrous water soluble solvent for both hydrophobic and hydrophilic polymer is very important because it is impossible to secure a firm bond between the hydrophobic polymer and the hydrogel when using an aqueous polymermonomer mixture. If a solvent free glycol monomethacrylate or acrylate is polymerized on the hard polymer, the bond, firm in absence of swelling agents, is impaired by subsequent swelling. The present method allows the polymerization binding in fully swollen state even in the absence of water which is introduced after the finished polymerization.

The toxicity or bad taste of the solvent is not important since the solvent is fully removed by washing. Moreover, glycerol diacetates are quite inocuous and their occasional traces remaining after an incomplete washing are by no means detrimental.

The mixture for providing the hydrogel layer may contain, of course, the usual pigments and fillers.

The method of the invention also allows for the rebasing of old artificial dentures either in a conventional mold or directly in the patients mouth, according to the chosen initiator of polymerization. First, a plaster mold is made with the old denture. Then, the thickness of the old denture is reduced by machining and the space so gained in the mold is filled with the mixture for providing the hydrogel layer.

The term "glycol" means any at least partly water-soluble aliphatic diol; besides of ethylene glycol, also diethylene glycol, triethylene glycol, propylene glycols, 1,4-butylene glycol and similar dihydric alcohols can be used, either alone or in any desired combination. Suitable selection of the glycol component in both soluble polymer and monomer mixture is another means for controlling the swelling capacity and mechanical behavior of the hydrogel.

Glycol methacrylates are generally preferred since they yield hydrogels with outstanding physical properties and very high-chemical stability. Moreover, they have the advantage that the hydrogels manufactured from them have been successfully tested for physiological inertness and compatibility with living tissues in tests lasing several years. The hydrogels from glycol acrylates are very similar in their physical properties, displaying only a little higher-swelling capacity in water and somewhat lower-chemical stability. They are, however, quite satisfactory for the purpose of the invention. Copolymers are glycol acrylates with glycol methacrylates are also very useful; this copolymerization, in connection with the above-mentioned selection of various glycols, offers to everybody skilled in the art a very broad scale of possible combinations for attaining any desired set of useful properties.

The invention is illustrated by following examples.

EXAMPLE 1

An artificial denture was made in an usual plaster mold using a dough prepared just prior of use from dibenzoyl peroxide containing fine grain polymethylmethacrylate and liquid methyl methacrylate monomer. The space for the hydrogel layer was secured by inserting a spacing foil which did not adhere to the polymerizing dough, e.g. tetrafluoroethylene or stannum, the foil was previously pressed onto the inner surface of the respective part of the mold and the mold was then shut with a slight pressure in order to expel the excess of the dough. Polymerization was then induced by heating the mold in a water bath. Prior to the completely finished polymerization the mold was opened, the spacing foil was removed and a doughlike mixture for making the hydrogel layer applied onto the denture with a slight excess. The mold was then closed again, the surplus of the dough removed, and the mold immersed into a cold water bath which was then heated to boil. The mold was kept in boiling water for at least 30 minutes, then immersed in cold water and carefully opened. The finished artificial denture was then washed for 2 to 3 days in distilled water which was changed often to completely remove the solvent. The mixture for the hydrogel layer consisted of one part of dry, noncross-linked ethylene glycol methacrylate polymer having average molecular weight of 260,000, grain size less than 0.1 mm., containing 1 percent of dibenzoyl peroxide, one part of ethylene glycol monoacetate, boiling at 183°–193° C. at 760 mm. Hg, and one part of ethylene glycol monomethacrylate, containing 0.35 percent ethylene glycol dimethacrylate. The powdered polymer was stirred with the liquid solvent-monomer mixture to form a dough.

The hydrogel layer did not undergo to any obvious change of size after having been kept for 3 days in water. It adhered firmly to the polymethylmethacrylate substrate.

EXAMPLE 2

A conventional plaster mold was filled with an old artificial denture. The thickness of the denture was then reduced by machining to provide a space between it and the mold. The ground surface was then wetted several times with a mixture of equal volume parts of methyl methacrylate and ethylene glycol monomethacrylate (containing 0.03 weight percent of the diester). Thereafter, the doughlike mixture according to example 1 was applied to the denture in the mold which was then closed and treated as described in example 1. An artificial denture rebased with a hydrogel layer was obtained.

EXAMPLE 3

The process described in example 1 was repeated with the difference that instead of plain glycol methacrylate polymer a copolymer of glycol methacrylate with 25 percent of methyl methacrylate was used. Said copolymer was prepared by a solvent copolymerization in dimethyl formamide according to the above-cited French Pat. Five percent of methyl methacrylate was added to the monomer which did not unfavorably affect the solubility of the copolymer. The resulting hydrogel was less soft and swelled less in water than that according to example 1 or 2.

EXAMPLE 4

The process according to example 3 was repeated with the only difference that 20 percent of the monomer was replaced by diethylene glycol monomethacrylate. The softness an swelling capacity were thereby increased to a value corresponding nearly to the hydrogel according to example 1.

EXAMPLE 5

The process described in example 1 was repeated, only the liquid component had the following composition: One part of glycerol diacetate (a commercial mixture of the 1,2- and 1,3-isomers), and one part of ethylene glycol monomethacrylate containing 0.5 percent of the dimethacrylate. The finished hydrogel layer adhered firmly to the base of the denture and showed good properties.

EXAMPLE 6

Noncross-linked ethylene glycol methacrylate polymer was prepared by boiling under reflux for 6 hours a mixture consisting of 10 parts of ethylene glycol monomethacrylate, 0.05 parts of ethylene glycol dimethacrylate, 89.5 parts of anhydrous methanol and 0.45 parts of azo-bis-isobutyronitrile. The solution thus obtained was cooled and poured into a tenfold volume of cold water. The swelled precipitate was decanted, three times washed with a 20 percent ethanol solution in water and dried at 20° C. under reduced pressure. The polymer was then comminuted and dissolved while stirring in a mixture of equal volumes of glycerol diacetate (commercial isomer mixture) and ethylene glycol monomethacrylate (containing 0.4 percent of the diester). The ratio polymer: liquid mixture was 1:2 by weight. Just before use 0.01 part of dibenzoyl peroxide, dissolved in a minimum amount of glycerol diacetate, was stirred in. Simultaneously the usual red pigment and 10 percent of finely divided silica were admixed. The highly viscous mixture was utilized for making a hydrogel layer in the way described in example 1.

EXAMPLE 7

The method according to example 2 was used with the difference that the liquid component contained glycerol diacetate instead of glycol monoacetate, and that 2 percent of diethylaminoethyl acetate were added thereto. The doughlike mixture was rapidly applied onto the ground base of the old artificial denture and the polymerization was carried out in the mouth of the patient instead of the mold. After 10 minutes an insoluble hydrogel layer was formed so that the denture could be removed. The polymerization was finished by leaving the denture 1 hour at ambient temperature. It was then washed first in 50 percent aqueous ethanol and than thoroughly in water until all remainders of the initiating system and the solvent have been removed. The hydrogel layer of the rebased denture corresponded exactly to the profile of the palate. All percentages and parts in the foregoing disclosure and examples are meant by weight if not stated otherwise.

As material for the hard skeleton the artificial dentures the usual polymethylmethacrylate was mentioned. The method according to this invention may be, however, used in the same way for dentures manufactured from other polymers or copolymers such as ethyl methacrylate, methyl acrylate, benzyl methacrylate and similar.

As peroxidic initiators different organic compounds such as methyl ethyl ketone hydroperoxide, di-isopropyl percarbonate and other usual polymerization catalysts may be used instead of the exemplified dibenzoyl peroxide. Inorganic peroxidic compounds, particularly persulfates may be also used, although their solubility in the anhydrous mixture is rather poor. As reduction agents are also suitable, besides of the mentioned diethylamino ethyl acetate, e.g. dimethyl aniline or p-toluene sulfinic acid or reductive derivatives of the latter well known in the art.

The amount of the solvent causing substantially the same swelling as water in equilibrium with the hydrogel, is usually somewhat lower than that of water in said equilibrium. It depends essentially on the value of the interaction parameter $\chi$ with respect to the cross-linked hydrogel and may be derived from it. The amount can be, however, established empirically, its value being by no means critical since comparatively low-tangential stresses do not cause separation of the hydrogel from the substrate.

The meaning of the interaction parameter $\chi$ is explained in detail e.g. in the well-known textbook J. P. Flory, Principles of Polymer Chemistry, Chapter XIII, New York, Cornell University Press, Ithaca 1953.

What we claim is:

1. The method of providing dentures having a hard polymeric acrylic base with a soft hydrogel layer comprising the steps of preparing a gellike coating composition consisting essentially of a noncross-linked, soluble polymer selected from the group consisting of glycol methacrylate and glycol acrylate polymers and copolymers thereof, a liquid monomer selected from the group consisting essentially of glycol monomethacrylates and glycol acrylates containing from 0.05 to 2 percent by weight of the corresponding diester, a polymerization initiator and an anhydrous water soluble solvent capable of dissolving said noncross-linked polymer and said hard polymeric acrylic base, said solvent being used in an amount sufficient to swell the hydrogel to approximately the same degree as it is swollen by a through water wash, applying said coating composition to said hard polymeric acrylic base, polymerizing said coating composition under free radical polymerization conditions, and thereafter removing said solvent and replacing the same with water.

2. Method as set forth in claim 1, wherein the surface of said hard polymeric acrylic base to be provided with the hydrogel layer is previously wetted with a mixture of the above said monomer with the monomer from which the hard polymer of the hard polymeric acrylic base has been prepared.

3. Method as set forth in claim 1, wherein said solvent is ethylene glycol monoacetate.

4. Method as set forth in claim 1, wherein said solvent is glycerol diacetate.

5. Method as set forth in claim 1, wherein said coating composition is prepared by stirring together before use two components, one consisting of the said noncross linked polymer in dry, powdered condition and a peroxidic initiator, the other consisting of the said liquid monomer and solvent.

6. Method as set forth in claim 1, wherein said coating composition is prepared by stirring together just before use two components, one consisting of the said noncross linked soluble polymer in dry, powdered condition and a peroxidic initiator, the other consisting of the said liquid monomer, said solvent and reducing agent forming together with the said peroxidic initiator an effective redox system, causing a rapid polymerization at temperatures under 40° C.

* * * * *